United States Patent [19]

Leslie

[11] Patent Number: 4,682,253
[45] Date of Patent: Jul. 21, 1987

[54] SERVO POSITIONING SYSTEM FOR DISK DRIVE SYSTEM

[75] Inventor: James B. Leslie, Rumbling Bridge, by Kinross, United Kingdom

[73] Assignee: Rodime PLC, Fife, Scotland

[21] Appl. No.: 854,825

[22] Filed: Apr. 23, 1986

[51] Int. Cl.⁴ .............................................. G11B 5/012
[52] U.S. Cl. ........................................ 360/77; 360/78
[58] Field of Search ........................... 360/77, 78, 135

[56] References Cited

U.S. PATENT DOCUMENTS

| | | | |
|---|---|---|---|
| 4,068,267 | 1/1978 | Inouye | 360/77 |
| 4,149,201 | 4/1979 | Card | 360/77 |
| 4,238,809 | 12/1980 | Fujiki et al. | 360/77 |
| 4,390,910 | 6/1983 | Wilson | 360/77 |
| 4,390,912 | 6/1983 | Hertrich et al. | 360/77 |
| 4,539,607 | 9/1985 | Fujiki | 360/77 |
| 4,578,723 | 3/1986 | Betts et al. | 360/77 |
| 4,602,304 | 7/1986 | Fultz | 360/77 |
| 4,613,915 | 9/1986 | Crouse et al. | 360/77 |

OTHER PUBLICATIONS

IBM Technical Disclosure Bulletin, vol. 20, No. 8, Jan. 1978, pp. 3243-3247, Sector Servo Method, R. L. Deremer et al.
IBM Technical Disclosure Bulletin, vol. 22, No. 12, May 1980, pp. 5436-5438, Quad-Burst Servo Pattern, C. C. Liu.

Primary Examiner—George G. Stellar
Attorney, Agent, or Firm—Dickstein, Shapiro & Morin

[57] ABSTRACT

An improved servo positioning system for a Winchester disk drive system is disclosed. A plurality of concentric servo tracks are provided on the surface of one disk. Each track is comprised of an equal number of frames of a preterminded length. Four basic frame patterns are utilized. In addition, a frame may also have a code bit in a predetermined position, in order to define the frame as a "one" or "zero" frame. The servo data is read by a dedicated servo head, digitized and fed to a logic array which receives as its only other input an 8 megahertz clock signal. The logic array detects the sync signals present in each frame and generates index, guardband and no sync signals therefrom. In addition, a plurality of windows, each corresponding to a predetermined portion of each frame, is generated. Those window signals are utilized to control a window control circuit which sequentially enables four similar peak dectors, one for each window. The peak detected signals are utilized to form the phase and quadrature signals utilized to provide proper positioning of the heads over the desired track.

30 Claims, 11 Drawing Figures

SERVO FRAME TRANSITION LOCATIONS

FIG. 1

FIG. 2    SERVO FRAME TRANSITION LOCATIONS

FIG. 4    BASIC SERVO FRAME TYPES

FIG. 3

200 ns
SERVO DIBIT TRANSITION

ENCODE/DECODE OF INDEX AND GUARDBAND

SERVO POSITIONING SYSTEM FOR DISK DRIVE SYSTEM

BACKGROUND OF THE INVENTION

The present invention relates to a magnetic disk storage apparatus, and more particularly, to a servo system which mechanically drives transducers in the magnetic disk storage system. Specifically, the present invention relates to a servo positioning system for use with closed-loop disk drive systems using a dedicated servo surface.

Magnetic disk storage systems, particularly those which use Winchester technology, and are thus known as "Winchester disk drive systems," are comprised of a stack of magnetic disks, a plurality of transducers, each of which cooperates electromagnetically with the corresponding magnetic disk, a motor which moves the transducers with respect to the magnetic disks, and circuitry for controlling the motor such that the transducers are moved to a desired position on the magnetic disks in accordance with a command from a central processing unit. In the case of closed-loop positioning systems utilized in such Winchester disk drive systems, the transducers are typically moved by voice coil motors. Various data may be reached on at least one of the magnetic disks, for use by the controller to ascertain the position of the transducers on the disk surface.

In some closed-loop positioning system Winchester disk drives, one surface of one of the magnetic disks is usually utilized as a servo disk, while the others are utilized as data disks. For example, in concurrently filed U.S. patent application Ser. No. 854,949, entitled "Rotary Voice Coil Actuator Micro-Hard Disk Drive System," commonly assigned herewith, the disclosure of which is incorporated herein, a maximum of four magnetic disks may be provided. The top surface of the top disk, in the preferred embodiment, is designated as the servo disk and contains servo positioning information. The remaining disks are utilized for data storage. One prior art magnetic disk storage apparatus having a dedicated servo disk and several data disk surfaces is disclosed in U.S. Pat. No. 4,068,267, to Inouye, entitled "Magnetic Disk Storage Apparatus in Which Servo Track Zone Provides Signals for Both Moving Speed and Position of Transducer."

In the disk drive system discolosed in a U.S. patent application entitled "Rotary Voice Coil Actuator Micro-Hard Disk Drive System," the servo data contained on the servo disk is utilized to control the positioning of the transducers, under servo control. This system is known as a pure closed-loop type positioning system. In the patent to Inouye, a dedicated servo disk is also used.

There is also known in the art a quasi-closed-loop disk drive system in which a dedicated servo surface is utilized in conjunction with a number of data surfaces which carry both data and servo information. That servo information is usually recorded in sectors around the circumference of the data disks, interspersed with the data. Examples of such prior art systems are U.S. Pat. No. 3,944,016, to Moghadam, entitled "Positioning Servo System for Disk Drives" and U.S. Pat. No. 4,072,990, to Case et al, entitled "Servo Positioning Ssytem for Data Storage Apparatus." Such systems have the disadvantage that additional data space is lost on the various data disks, in order to provide servo information in addition to that recorded on the dedicated servo surface.

Another approach taken in the prior art is set forth in U.S. Pat. No. Re. 32,075 entitled "Data Transducer Position Control System for Rotating Disk Data Storage Equipment," to Harrison et al, in which a single servo sector is located on one surface of one of the disks. A coarse positioning system, having a light grating, is utilized for coarse positioning while the servo sector is utilized for fine positioning. Likewise, in the Case et al and Moghadam devices, the dedicated servo surface is utilized for fine positioning while a different system is utilized for coarse positioning.

All of the above-mentioned prior art devices utilize a phase-locked-loop or oscillator in controlling the transducer positioning. Also, with respect to those disk drive systems which utilize portions of each disk surface in addition to a dedicated servo surface, there is necessarily less usable data recording area and thus a lower capacity disk drive.

The elimination of such phase-locked-loop or oscillator, as applicant has to accomplished, renders the servo positioning mechanism much more immune to drift as well as eliminating the need for offsets and adjustments to the phase-locked-loop itself. The servo positioning system of the present invention allows the production of a disk drive system of high capacity and accuracy. In addition, no "out-of-lock faults" can occur due to defects in the media of the disks.

SUMMARY AND OBJECTS OF THE INVENTION

In view of the foregoing, it should be apparent that there still exists a need in the art for a servo positioning system for use with a dedicated servo disk surface which produces accurate signals for positioning a ganged series of transducers in a simple and precise manner and without the need for phase-locked-loops or phase-locked-oscillators. It is, therefore, a primary object of this invention to provide a system for positioning a plurality of transducers in a hard disk drive system which is characterized by simple electronic circuitry and which is particularly useful in Winchester disk drive systems.

More particularly, it is an object of this invention to provide a servo positioning system for a disk drive as aforementioned having simple and reliable electronic circuitry which is not subject to the disadvantage encountered when utilizing phase-locked-loops or oscillators in constructing such positioning systems.

Still more particularly, it is an object of this invention to provide a servo positioning system utilizing a dedicated servo surface with a quadrature type servo having four basic track patterns which are repeated across the disk surface.

Another object of the present invention is to provide a reliable and relatively inexpensive servo positioning system for use in accurately positioning the transducers utilized with Winchester disk technology systems.

A still further object of the present invention is to provide a servo positioning system for a Winchester disk drive system in which media defects do not produce out-of-lock faults.

Briefly described, these and other objects of the invention are accomplished by providing a plurality of concentric servo tracks on the surface of one disk of a Winchester disk drive. Each track is comprised of a like number of the same frames of a predetermined length, such as, for example, six microseconds. Four basic frame patterns are utilized and are repeated across the tracks of the disk. In addition, a frame may have an additional dibit transition written in its code position in order to define the frame as a "one" frame.

A plurality of guardband tracks are provided on an outer guard zone. A sequence of one and zero frames is used to encode the guard areas on the disk. In a similar manner, a different sequence of one and zero frames is used to encode an index area at the start at each track. By the use of a dedicated servo head, the information contained on the servo tracks is read and used to control the positioning of the transducers.

With these and other objects, advantages and features of the invention that may become hereinafter apparent, the nature of the invention may be more clearly understood by reference to the following detailed description of the invention, the appended claims and to the several drawings attached herein.

DETAILED DESCRIPTON OF THE PREFERRED EMBODIMENT

Figure 1:
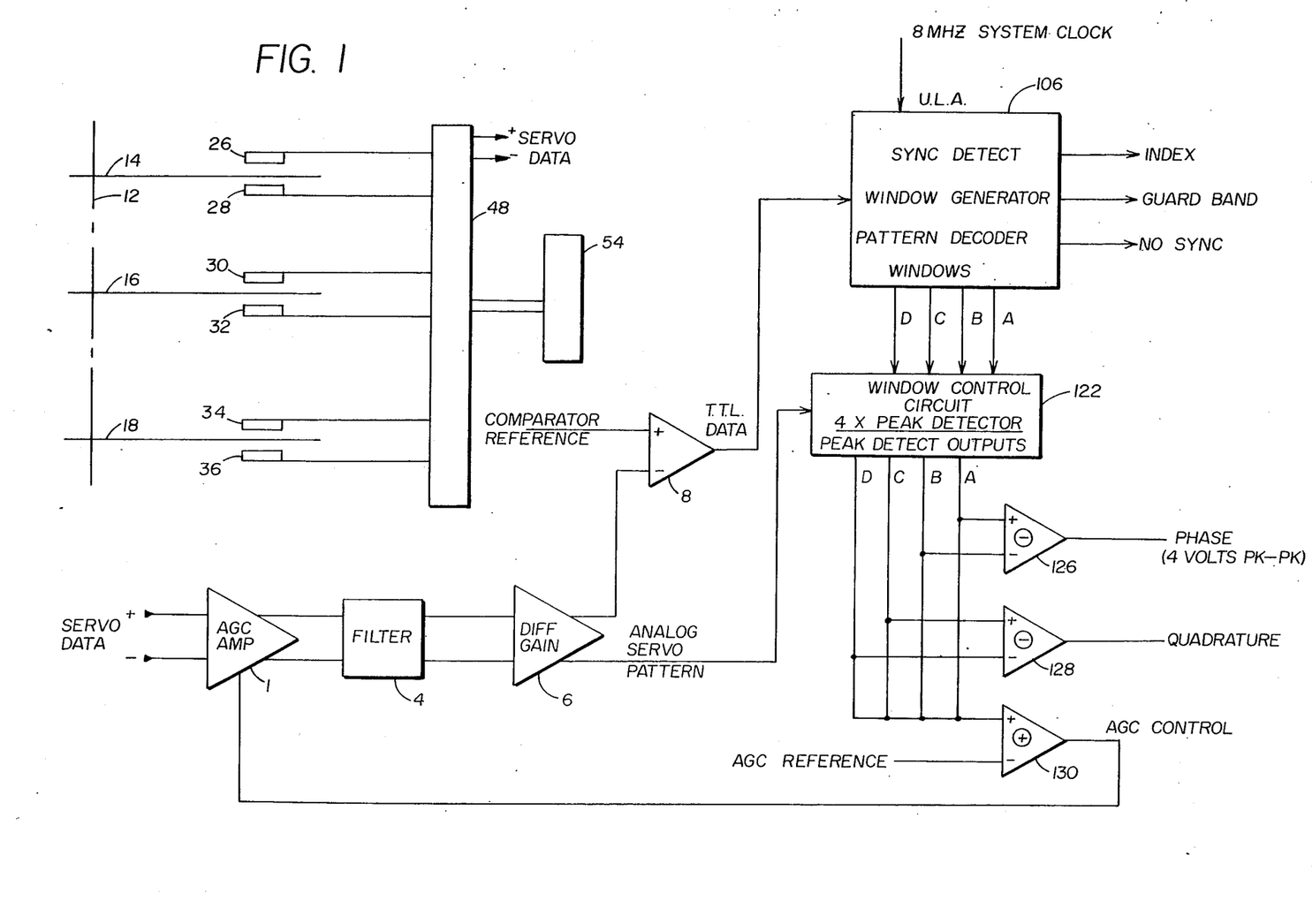
FIG. 1 is a diagramatic illustration of a typical magnetic disk storage system together with a block diagram of the servo demodulator and logic circuitry utilized with the servo positioning system of the present invention.

Referring now in detail in the drawings wherein like parts are designated by like reference numerals throughout, there is illustrated in FIG. 1 a diagramatic representation of a disk drive system with which the servo positioning system of the present invention may be used. A plurality of disks 14, 16 and 18 are mounted to a spindle 12 for rotation by a spindle motor (not shown). A plurality of transducers, 26, 28, 30, 32, 34, and 36 are arranged by means of a positioning mechanism 48 over the disks. An actuator motor, such as a rotary voice coil motor 54, is used to position the heads over the disks.

In the preferred embodiment, the servo positioning system utilizes a dedicated servo surface, for example the top surface of the disk 14. Thus, servo head 26 is utilized to read information from that disk surface, which information is utilized to control the positioning of the data heads 28, 30, 32, 34, and 36. It will be readily understood by those of ordinary skill in the art that the servo positioning system described herein may be utilized with a disk drive system having from one to any number of disks, such as four disks, as disclosed in copending U.S. patent application Ser. No. 854,949. The servo head 26 may be of similar construction and twice the width of such data heads.

Figure 10:
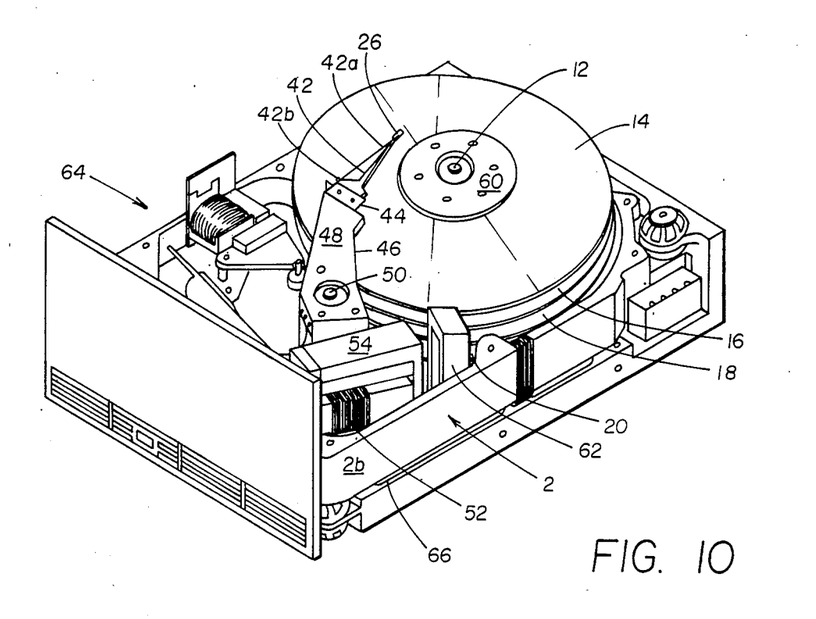
FIG. 10 is a top perspective view of a disk drive system with which the present inventive servo positioning system may be used.

A Winchester disk drive for use with the present invention is shown in FIG. 10. As shown therein, four micro-Winchester disks, 14, 16, 18 and 20, are arranged on the hub (not shown) of a D.C. motor (not shown) for rotation within the housing 2. A typical magnetic head 26, is attached to a flexure 42 which is attached to a finger 44 which is formed as a part of the support arm 46. That support arm forms part of the positioning mechanism 48 which is rotated about a fixed arm spindle 50 by means of a rectangular coil 52 attached thereto. The coil 52 is mounted in such a manner that it is driven by voice coil motor 54.

A breather filter (not shown) is provided on the top half of the disk housing adjacent to the center of the top hub plate 60 of the D.C. spindle motor. A recirculating filter 62 is located inside the HDA chamber 64 in a suitable position to filter the flow of air resulting from the pumping effect of the rotating disks when the disk drive is in operation. The top casing (not shown) seals the enclosure by means of a continuous gasket positioned between itself and the bottom casing 2b. An electronics board 66 is fixed to the bottom casing and covers the full area of this face of the disk drive. The D.C. motor has its center spindle 12 fixed to the bottom half 2b of the disk drive unit by means of a press fit. The top of the spindle 12 is fixedly mounted to the upper casing half by suitable means, such as a screw (not shown).

The typical read/write magnetic head 26 is mounted on one end 42a of a flexure 42, which serves to support it over the disk surface. The other end 42b of flexure 42 is attached to a finger 44 of a support arm 46. The flexure 42 is a thin rectangular stainless steel foil. The positioning arm 46 is rotatably mounted to the steel spindle shaft 50 by means of grub screws (not shown) and rides on suitable bearings (not shown) thereon. The support arm 46 is angled towards the disk such that, together with an additional angle provided by the fingers 44 of the support arm 46, the heads are placed in their proper position. Such construction ensures that the heads are always over the disk surfaces, even at both extreme positions of travel of the positioning mechanism 48.

A rectangularly-shaped rotary voice coil motor 54 is mounted to the lower casing 2b of the disk drive system adjacent to the end of the positioning arm 46 opposite the magnetic heads. The rectangular coil 52 attached to that end of the arm 46 is arranged to cut the magnetic force field created by the voice coil motor 54 such that it causes the positioning mechanism 48 to rotate about the fixed spindle shaft 50. The support arm assembly 46 is statically balanced about the actuator spindle 50.

Figure 2:
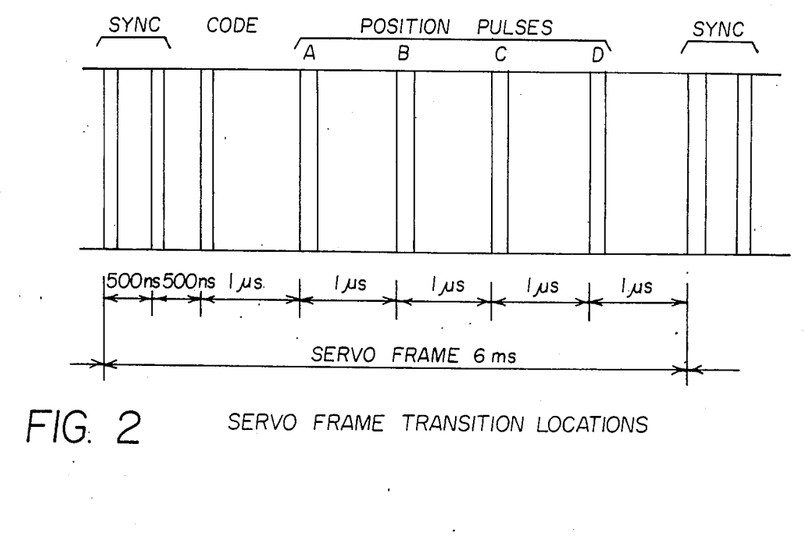
FIG. 2 is a diagram showing the servo frame transition locations.
Figure 4:
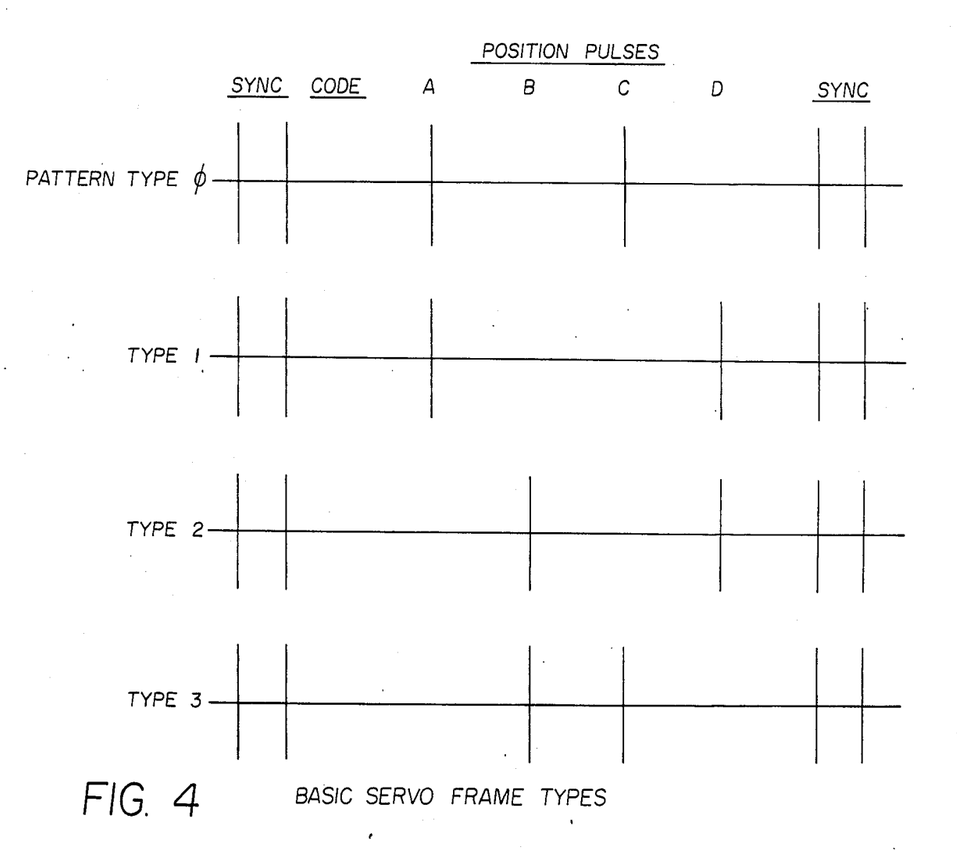
FIG. 4 is a diagram showing the four basic frame types utilized with the servo positioning system of the present invention.

Referring now to FIG. 2, there is shown therein a servo frame with all of the possible transition locations identified thereon. The servo positioning system of the present invention is a quadrature type servo in which four basic track patterns, as shown in FIG. 4, are repeated across the disk surface. Each servo track is made up of a repeated sequence of transitions called a "servo frame". A servo frame is six microseconds long and each servo track contains 2,778 integral frames.

As shown in FIG. 2, each frame comprises two sync pulses, one beginning 500 nanoseconds after the other, a code pulse beginning 500 nanoseconds after the beginning of the second sync pulse and four position pulses A, B, C, and D, each beginning one microsecond after the beginning of the preceeding pulse. The total number of such servo tracks contained on, for example, the dedicated servo surface is at least 882. A portion of those servo tracks located at the outermost tracks of the disks are coded as guardband tracks in order to determine the position of track zero on the disk. In the preferred embodiment, there are eight such guardband tracks located outside the end crash stop of the disk drive system.

Figure 3:
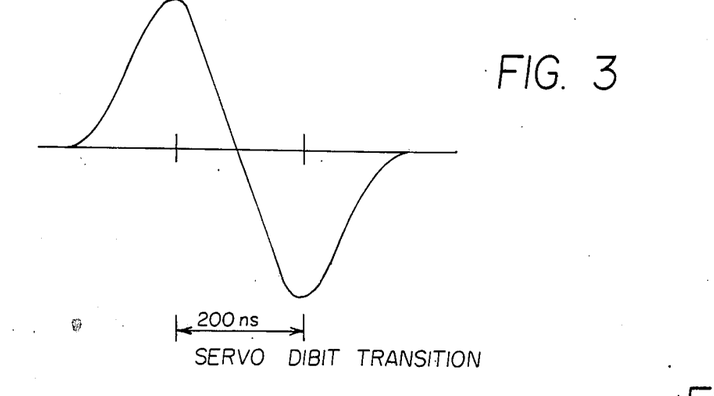
FIG. 3 is a diagram showing the servo dibit transition signal.

All of the servo pattern transitions discussed herein, and as shown in many of the figures, consist of dibit transitions having a transition spacing of 200 nanoseconds, as shown in FIG. 3. As shown in FIG. 2, a sync character, which consists of two such dibit transitions 500 nanoseconds apart, is written at the start of every frame in order to synchronize the servo pattern decode circuit. The frames are aligned on adjacent tracks so that the sync character forms a continuous transition across each track boundary.

The four basic frame patterns are shown in FIG. 3. Pattern type zero contains the sync character transition, as well as transitions at position pulses A and C. Pattern type one, in addition to the dual sync transitions, contains transitions at positions pulses A and D. In a similar manner, pattern type two contains transitions at position pulses B and D, while pattern type three contains transitions at positions pulses C and D.

Furthermore, a frame may have an additional transition written at the code position, as shown, for example, in FIG. 2. Such frames which contain that additional transition or "code bit," are defined as a "one" frame. Those frames which do not contain such a code bit are defined as normal or "zero" frames. A sequence of one and zero frames is used by the servo positioning system of the present invention to encode the guardband and index areas on the disk.

Figure 6:
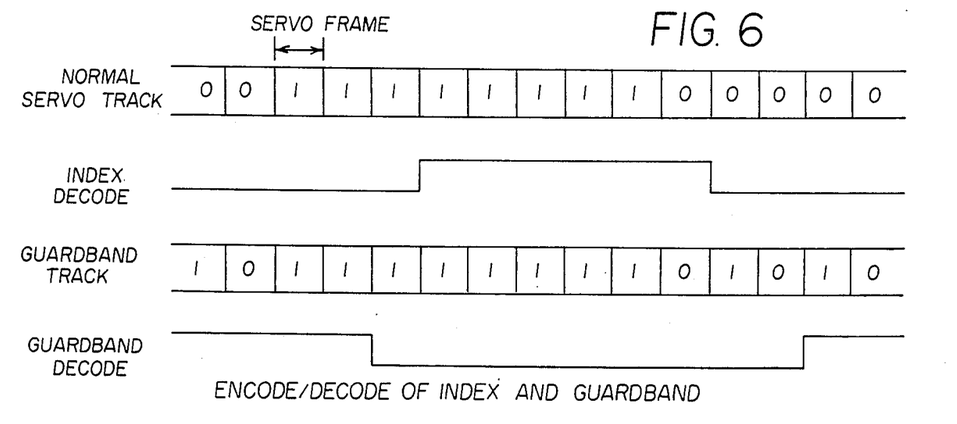
FIG. 6 is a diagram showing the encode/decode of the index and guardband.

As shown in FIG. 6, the index area is encoded as eight sequential one frames at the start of each track. A guardband track is encoded as two alternate one and zero frames, except for the index area which is encoded as previously described. When the servo pattern is decoded, an index is output after three sequential one frames, while a guardband signal is outputted after four alternate one and zero frames.

During manufacture, the servo disk surface is written after the disk is mounted onto an HDA in order to ensure total coverage between the drive end stops, as well as correct head alignment. Eight guardband tracks are written starting at the outside end stop with pattern type zero, followed by a minimum of 874 normal servo tracks. Additional servo tracks are then written to fill in to the inside end stop. The pattern type is cycled from pattern zero to pattern three for each track change.

Figure 5:
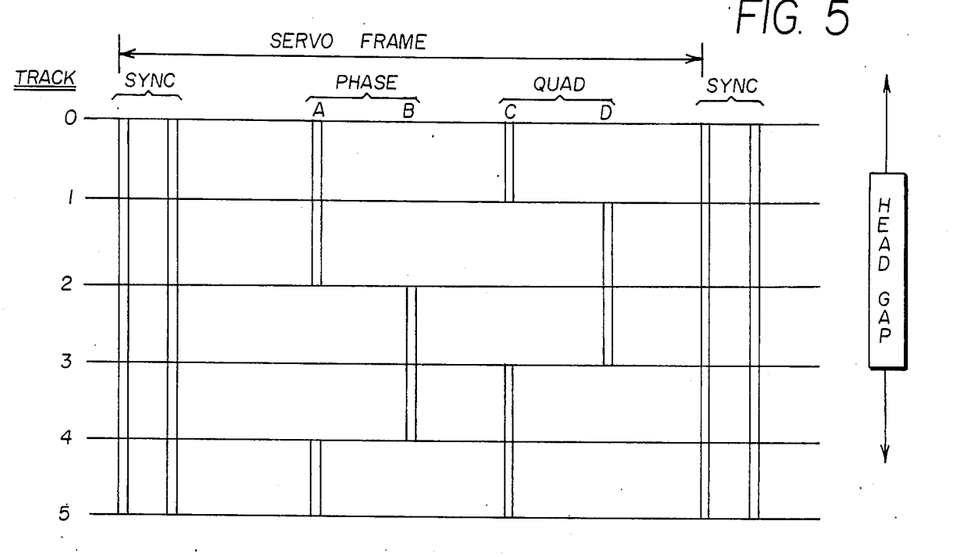
FIG. 5 is a diagram showing the dibit transitions contained within a single servo frame for a plurality of tracks for use with the servo positioning system of the present invention.

Referring now to FIG. 5, there is shown therein, continuous servo frames for a sample plurality of tracks, namely tracks zero through five. As the servo head passes over the two sync pulses, it detects same. The head, which may be, for example, centered about track one, then senses the dibit in position A and, there being no dibit in position B, the phase signal thus created, which is determined by subtracting the signal in position B from that in position A, yields a high level or "one" signal. As the head passes position C, it senses the dibit transition, as it also does as it passes position D. Since the quad signal is determined by subtracting the dibit transition, if present, at position D from that, if present, at position C, the resulting quad signal in this instance is zero. By combining the phase and quad signals, the servo positioning system of the present invention uniquely determines and is centered over the track over which the servo head is positioned.

Figure 9:
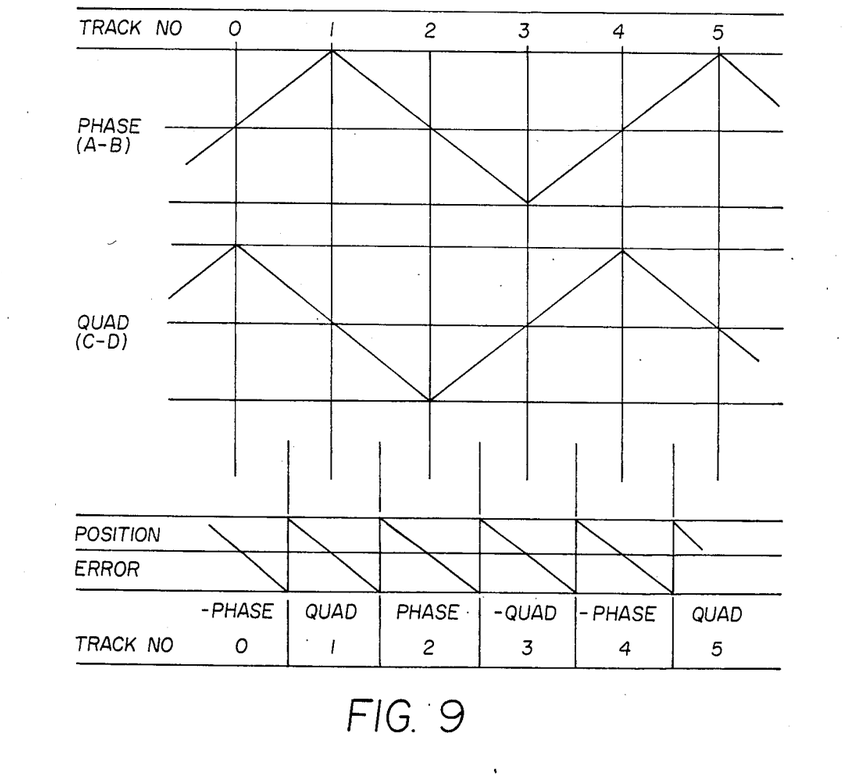
FIG. 9 is a diagram showing the resulting phase, quadrature and position signals developed from the servo frame shown in FIG. 5.

The relationship between the phase and quad signals and the track number is shown in FIG. 9. That figure shows the corresponding dibit transitions for FIG. 5. Also shown in FIG. 9 is the position error signal, which is zero if the servo head is centered exactly over the track. In the event that the position error signal is not zero, that signal acts to adjust the positioning mechanism, in a known manner, to center the servo head, and thus the data heads which are ganged thereto, directly over the center of the selected track.

Figure 8:
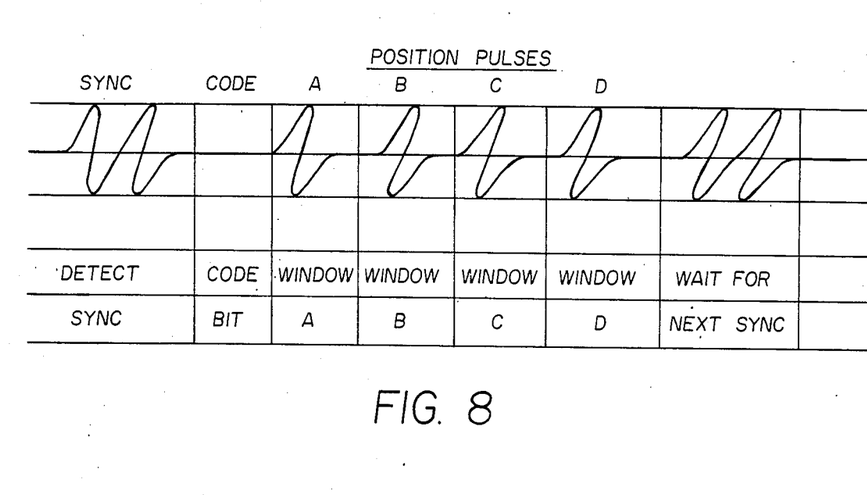
FIG. 8 is a diagram showing the windows, sync detect and code bit locations used in a single frame of the servo positioning system of the present invention.

FIG. 8 shows the timing scheme for the present inventive servo positioning system. The times during which the sync detect, code bit and windows A-D occur are the same as those shown in FIG. 2. Thus, the sync detect occurs over the first one microsecond of the frame, the code bit over the next microsecond and so forth. As will be explained hereinafter, the timing for detecting the signals present in each frame is incorporated in an uncommitted logic array (ULA) 106, which may be Part Number VGC 900, manufactured by VLSI Technology, Inc.

The window generation also occurs in that logic array 106 and is such that, during a predetermined time after the sync dibit transitions are detected, namely between one and two microseconds thereafter, a window A is opened during which the circuitry of FIG. 1 determines whether a dibit transition has occurred at position A. In a like manner, windows are opened to detect position pulses B, C, and D.

Figure 7:
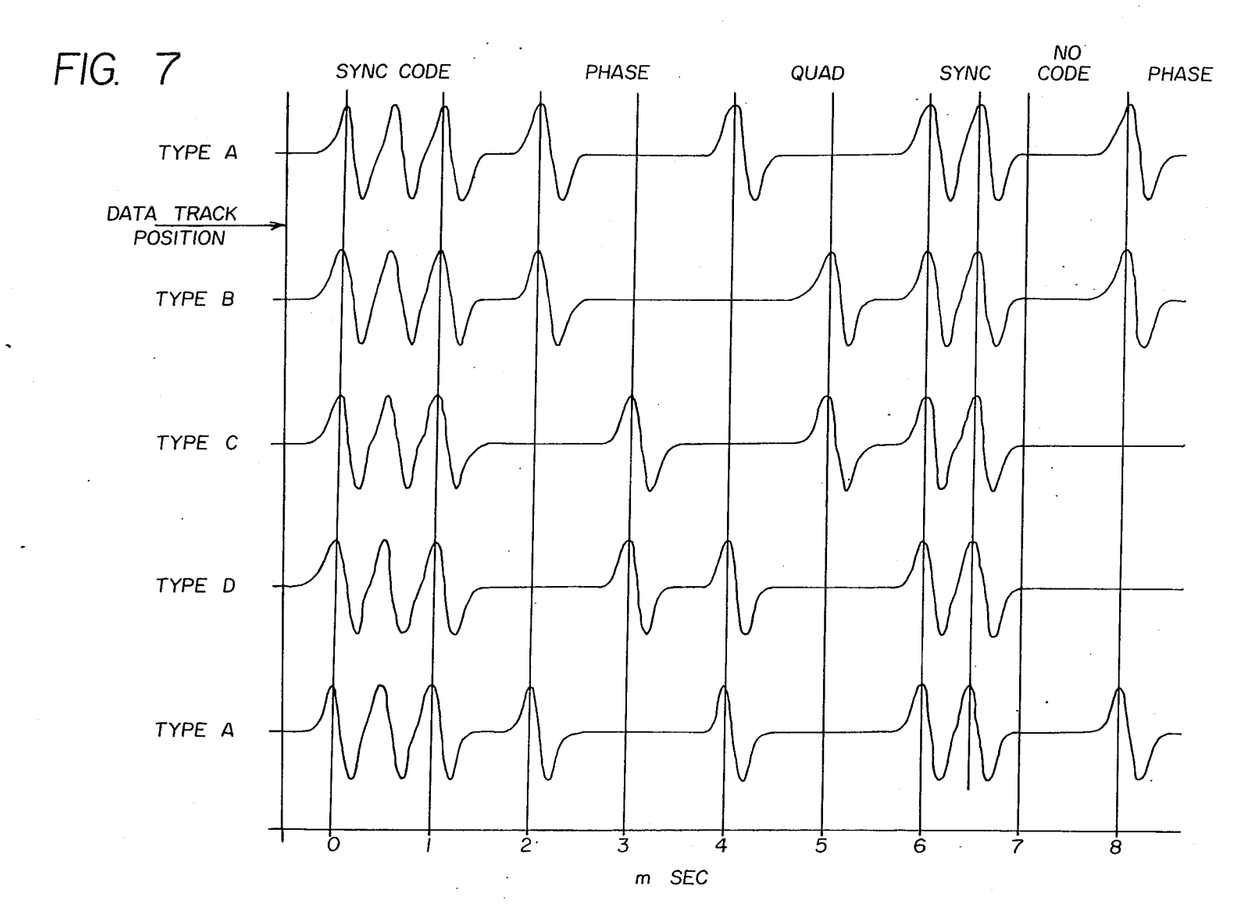
FIG. 7 is a diagram showing the four different types of signals that can make up a servo track in which the phase and quadrature signals are represented in place of the individual dibit representations as shown in other figures.

FIG. 7 shows the dibit signals for the four types of frame patterns, corresponding to those set forth in FIG. 4, with a code pulse shown in the first frame of each pattern type and no code pulse shown in the second frame.

FIG. 8 shows all of the possible dibit transitions, except the code bit, in their proper time position within a single frame such that they can be detected within each of the four windows in order to determine the position.

Figure 11:
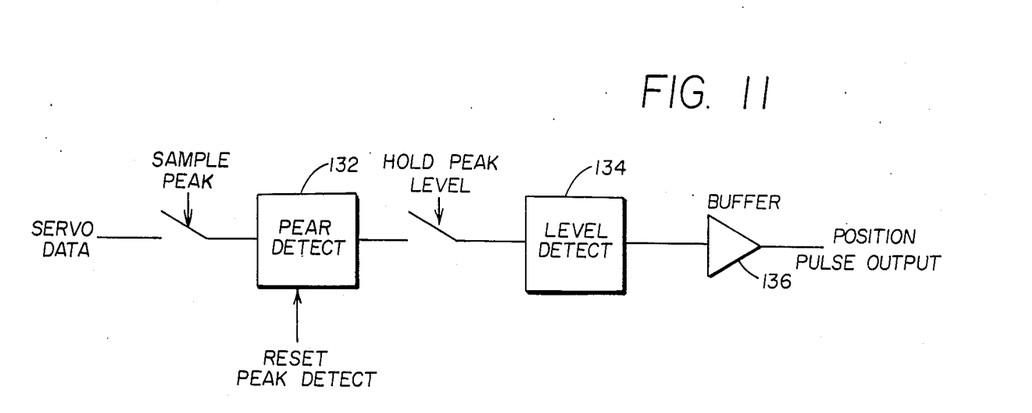
FIG. 11 is a block diagram of the sample and hold circuitry of FIG. 1.

As shown in FIG. 1, the servo data sensed by the data head 26 is inputed into an operational amplifier which serves as an automatic gain control amplifier 1. Both the positive and negative portions of the dibit signals are fed, again differentially, through a filter 4 to an operational amplifier which functions as a differential gain amplifier 6. The positive portion of the analog servo signal is fed to the negative input of a comparator 8. The positive input of that comparator 8 is held at a comparator reference such that a signal output from that comparator is the TTL data. That data is fed to the uncommitted logic array 106 whose operation will be described hereinafter. The negative output from the differential gain amplifier 6, which is the analog servo pattern, is fed to a window control circuit 22, which contains four peak detector circuits as shown in FIG. 11.

The uncommitted logic array 106 receives as inputs both the TTL data from comparator 8 and an eight megahertz system clock signal. Through the appropriate logic, the incoming TTL data is used by the uncommitted logic array 106 to detect the sync pulse, to generate the four windows corresponding to position pulses A, B, C, and D, and generally to operate as a pattern decoder.

As described previously, the uncommitted logic array 106 operates as a pattern decoder by detecting the presence or absence of a code bit for a certain predetermined number of frames in order to determine whether the track within which those frames is located is a guardband track, as well as to determine the index, or beginning of each data track. Each of the index, guardband, and no sync signals are fed to the on-board microprocessor (not shown) and to the servo controller (not shown). A block diagram illustrating the operation of a Winchester disk drive with which the present servo positioning system may be utilized is shown in FIG. 6 of concurrently filed U.S. patent application Ser. No. 854,949.

The analog servo pattern from the differential gain amplifier 6 is fed as one input to the window control circuit 22. There are four additional inputs to that window control circuit 22, one for each of the windows A-D. Those input window timing signals, which are generated by the uncommitted logic array 106, based upon the detection of the two sync dibits, actuate each of the four peak detectors contained in the window control circuit 22 to be operative during the appropriate microsecond long window period in order to provide peak detection for each of the four position pulses A-D.

Each of the peak detected outputs is fed to the appropriate inputs of the appropriate operational amplifier 126, 128, and 130. Thus, the peak detected position pulses for position signals A and B are fed to the positive and negative inputs of a phase operational amplifier 126, to produce the phase signal. The peak detected position pulses for positions C and D are fed respectively to the positive and negative inputs of a quadrature operational amplifier 128 to produce the quadrature signal. All of the peak detected position pulse signals are fed to the positive input of an operational amplifier 130. The negative input of that operational amplifier 130 is tied to a reference signal. The difference between the input and output signals of the operational amplifier 130, namely the AGC control signal, is fed back to the automatic gain control amplifier 1, to control the gain applied to the incoming servo data from the servo head 26.

Each of the four peak detector circuits contained within the window control circuit 122 is shown in functional block diagram form in FIG. 11. The incoming servo data is initially peak sampled and then peak detected by peak detector 132. The detected peak is then held and the level detected by level detector 134. That detected level is buffered by operational amplifier 136 whose output is the sensed position pulse for the appropriate window. The peak detector 132 is reset upon the detection of the sync dibits.

In operation, the series of four peak detectors works as follows. Upon detection of the second sync dibit, each peak detector 132 is reset and window A is opened, thus enabling the peak detector corresponding thereto to sample any dibit present representing position A. The peak detected position A signal is held and then the peak detector corresponding to position B is enabled, thus sampling any position signal present at B. The sampled position B signal is then held and the windows for position signals C and D are opened in a like manner. Of course, after each peak level is held and detected, it is output through the buffer 136 as a position pulse output and is sent to the appropriate operational amplifier 126, 128 and 130. It will on be understood, however, that the timing of each of the windows is controlled by logic contained in the uncommitted logic array 106.

As previously described, the uncommitted logic array 106 operates to decode each frame in order to determine the position information for the servo positioning system of the present invention. The analog servo signal read by the servo head 26 is converted to a digital pulse stream using the threshold comparator 8. That digital signal is then fed into the gate array 106 which functions to detect the sync character, look for the code bit present in the frame, if any, and functions to open the windows within the window control circuit in order to sample the servo position peaks. The eight megahertz clock input to the gate array 106 is used to sample the incoming digital data. As described, once the sync is detected, the windows are opened in a preset sequence in conjunction with the four peak detectors, one for each position.

As described, each peak detector samples the incoming position peak, transfers that peak level to a hold capacitor, and then resets the sampling capacitor.

There has thus been described a servo pattern positioning system in which a sampling system is utilized in place of a phase-locked-loop or phase-locked-oscillator system. Such a system must detect the sync bits in order to detect the beginning of a frame. As compared to prior art phase-locked-loop systems, a sync signal is required for each frame and the sync field must not change.

The code bit is utilized such that a servo frame may be encoded as a one or a zero. The sequence of one and zero frames may be used, for example, to encode the outer guardband and to indicate the index.

Since the sampling mechanism utilized with the inventive servo positioning system is reset every frame, in the event of a corrupted frame due to a media defect, that one bad frame will not upset the servo positioning system.

Thus, in seeking at full speed across a track, for example, at a speed of 45 microseconds per track, one bad frame may use up six microseconds of time, but at least five frames are still left, which is a sufficient number with which to determine the position error signal from the track.

It will be understood by those in the art that various sample/hold detectors can be utilized for the circuitry shown in schematic block diagram form in FIG. 11. In addition, those areas in which it is believed that those of ordinary skill in the art are familiar, have not been described herein in order to not unnecessarily obscure the invention described herein.

Although only a preferred embodiment is specifically illustrated and described herein, it will be appreciated that many modifications and variations of the present invention are possible in light of the above teachings and within the purvue of the appended claims without departing from the spirit and intended scope of the invention.

What is claimed is:

1. A servo positioning system for operating the positioning mechanism of a disk drive having at least one disk rotating at a constant speed, transducer means associated with each surface of said at least one disk, one surface of said at least one disk containing only servo information with the remaining disk surfaces being available for data storage, and means for decoding said servo information for controlling the operation of said positioning mechanism, said servo information comprising:
   a plurality of concentric tracks recorded on said servo surface, each of said concentric tracks having a like plurality of frames of a predetermined equal time period occurring over the length of each of said concentric tracks;
   each of said frames including one of a plurality of different basic servo patterns each track having only a single pattern repeating thereon; and
   each of said frames additionally containing syncronization and coding information such that said detecting means can extract indexing and guardband information encoded on said tracks.

2. The servo positioning system of claim 1, wherein said synchronous information occurs at the start of each frame and all frames in adjacent tracks are aligned such that said synchronous information forms a continuous transition across track boundaries.

3. The servo positioning system of claim 2, wherein said sync information is comprised of two pulses spaced a predetermined time apart.

4. The servo positioning of claim 1, wherein said code information is comprised of a single pulse which occurs a predetermined time after the occurrence of said sync information.

5. The servo positioning system of claim 1, wherein the presence of code information in each frame forms a pattern which is used by said detecting means to detect the index information for said servo positioning system.

6. The servo positioning system of claim 1, wherein the presence of code information in each frame forms a pattern which is used by said detecting means to detect the guardband information for said servo positioning system.

7. The servo positioning system of claim 5, wherein the pattern indicating the index is eight consecutive code pulses.

8. The servo positioning system of claim 6, wherein the pattern indicating a guardband is two alternate code pulses and no code pulses.

9. The servo positioning system of claim 3, wherein each of said pulses is a dibit transition.

10. The servo positioning system of claim 4, wherein said pulse is a dibit transition.

11. The servo positioning system of claim 1, wherein said plurality of concentric tracks comprises a plurality of guardband tracks at the outermost edge of said servo surface followed by a plurality of normal servo tracks and wherein one of said guardband tracks contains a frame pattern different than that of the other guardband tracks, indicative of track zero.

12. The servo positioning system of claim 11, wherein said plurality of guardband tracks, at the outermost edge of said servo surface is composed of eight concentric tracks, each track being of a plurality of like frames.

13. The servo positioning system of claim 11, wherein said plurality of normal servo tracks is composed of a plurality of tracks of a single frame pattern, which pattern repeats every four tracks.

14. The servo positioning system of claim 13, wherein the plurality of concentric normal servo tracks is at least approximately 874.

15. The servo positioning system of claim 1, wherein there are 2,778 frames per concentric track.

16. The servo positioning system of claim 1, wherein said detecting means comprises:
   means for digitizing said said servo information;
   logic means for analyzing said digitized information to extract the index, guardband and sync information, said analyzing means also generating a plurality of timing windows; and
   a plurality of peak detecting means, being activated in turn during by said plurality of timing windows, for detecting the occurrence of position pulses within said digitized servo information.

17. The servo positioning system of claim 16, wherein the only other input to said logic means is a clocking signal.

18. A servo positioning system for controlling the positioning mechanism of a disk drive having at least one rotating hard disk having a plurality of concentric tracks thereon, transducer means associated with each surfaces of said at least one disk, one surface of said at least one disk being dedicated for recording servo information thereon and means for decoding said servo information for controlling the operation of said positioning mechanism, wherein said servo information comprises:
   a plurality of like frames of a predetermined equal time period recorded on a plurality of the outermost tracks of said rotating hard disk;
   a like plurality of frames of a similar predetermined equal time period recorded on a plurality of said concentric tracks adjoining said plurality of like frames recorded on a plurality of said outermost tracks, said tracks comprising a constant repeating of different frame patterns from track to track; and
   each of said different frame patterns contain sync and code information in addition to the position information contained in said different frame patterns.

19. The servo positioning system of claim 18, wherein said code information is in the form of a pulse and the presence or absence of such pulse in a frame forms a pattern indicative of index and guardband signals.

20. The servo positioning system of claim 18, wherein said synchronous information occurs at the start of each frame and all frames in adjacent tracks, are aligned such that said synchronous information forms a continuous transition across track boundaries.

21. The servo positioning of claim 18, wherein said code information is comprised of a single pulse which occurs a predetermined time after the occurrence of said sync information.

22. The servo positioning system of claim 18, wherein the presence of code information in each frame forms, a pattern which is used by said detecting means to detect the guardband information for said servo positioning system.

23. The servo positioning system of claim 19, wherein the pattern indicating the index is eight consecutive code pulses.

24. The servo positioning system of claim 19, wherein the pattern indicating a guardband is two alternate code pulses and no code pulses.

25. The servo positioning system of claim 18, wherein said plurality of guardband tracks, at the outermost edge of said servo surface is composed of seven concentric tracks of a plurality of like frames and one concentric track having a like plurality of frames having a different pattern.

26. The servo positioning system of claim 18, wherein said plurality of normal servo tracks is composed of a plurality of tracks of a single frame pattern, which pattern repeats every four tracks.

27. The servo positioning system of claim 18, wherein said detecting means comprises:
  means for digitizing said said servo information;
  logic means for analyzing said digitized information to extract the index, guardband and sync information, said analyzing means also generating a plurality of timing windows; and
  a plurality of peak detecting means, being activated in turn during by said plurality of timing windows, for detecting the occurrence of position pulses within said digitized servo information.

28. The servo positioning system of claim 27, wherein the only other input to said logic means is a clocking signal.

29. A method for controlling the positioning system of a disk drive having at least one rotating hard disk having a plurality of concentric tracks thereon, transducer means associated with each surface of said at least one disk, one surface of said at least one disk being dedicated for recording servo information thereon, comprising the steps of:
  recording a plurality of like frames of a predetermined equal time period on the outermost plurality of concentric tracks of said rotating hard disk;
  recording a like plurality of frames of a similar predetermined equal time period on a plurality of concentric tracks adjoining said plurality of like frames recorded on a plurality of said outermost tracks, said tracks comprising a repetition of different frame patterns from track to track, wherein each of said different frame patterns contains sync and code information in addition to position information contained in said different frame patterns; and
  decoding said servo information for controlling the operation of said positioning system.

30. The method of claim 29, wherein said decoding step comprises the steps of:
  digitizing said servo information;
  detecting the presence of sync and code information and generating index, guard and and sync signals therefrom;
  generating a plurality of timing windows using said sync signals; and
  peak detecting said position information, under control of said plurality of timing windows, for generating position control information for controlling said positioning system.

* * * * *